(12) United States Patent
Yamakawa

(10) Patent No.: US 8,813,801 B2
(45) Date of Patent: Aug. 26, 2014

(54) PNEUMATIC TIRE

(75) Inventor: Takahiro Yamakawa, Hiratsuka (JP)

(73) Assignee: The Yokohama Rubber Co., Ltd, Tokyo (JP)

( * ) Notice: Subject to any disclaimer, the term of this patent is extended or adjusted under 35 U.S.C. 154(b) by 664 days.

(21) Appl. No.: 13/062,474

(22) PCT Filed: Sep. 11, 2009

(86) PCT No.: PCT/JP2009/065937
§ 371 (c)(1),
(2), (4) Date: Mar. 4, 2011

(87) PCT Pub. No.: WO2010/030001
PCT Pub. Date: Mar. 18, 2010

(65) Prior Publication Data
US 2011/0162770 A1 Jul. 7, 2011

(30) Foreign Application Priority Data
Sep. 12, 2008 (JP) .................................. 2008-235017

(51) Int. Cl.
*B60C 11/12* (2006.01)
*B60C 11/03* (2006.01)
(52) U.S. Cl.
CPC .......... B60C 11/12 (2013.01); *B60C 2011/1213* (2013.01); *B60C 2011/0388* (2013.01); *B60C 2011/1254* (2013.01); *B60C 2011/1209* (2013.01); *B60C 2011/1268* (2013.01); B60C 11/0302 (2013.01); B60C 11/0306 (2013.01); *Y10S 152/03* (2013.01)
USPC .............. 152/209.25; 152/209.18; 152/DIG. 3
(58) Field of Classification Search
CPC ............ B60C 11/1218; B60C 11/1236; B60C 11/1259; B60C 11/2011; B60C 2011/1209; B60C 2011/1213; B60C 2011/1231; B60C 2011/1254; B60C 2011/1268; B60C 2011/1259
USPC ................ 152/209.1, 209.18, 209.25, DIG. 3
See application file for complete search history.

(56) References Cited

U.S. PATENT DOCUMENTS 5,109,903 A    5/1992  Watanabe et al.
5,327,953 A *  7/1994  Ichiki ....................... 152/209.25
(Continued)

FOREIGN PATENT DOCUMENTS

FR    2703002 A1    9/1994
GB    460 338 A     1/1937
(Continued)

OTHER PUBLICATIONS

Information Disclosure Statement submitted in U.S. Appl. No. 12/451,195, filed Oct. 29, 2009.
(Continued)

*Primary Examiner* — Eric Hug
(74) *Attorney, Agent, or Firm* — Global IP Counselors, LLP

(57) ABSTRACT

A pneumatic tire has a tread surface for simultaneously achieving both enhanced on-ice performance and enhanced durability. The pneumatic tire includes sipes extending in the width direction of the tire that are arranged at intervals in the circumferential direction of the tire at least in shoulder blocks that are divided by longitudinal grooves extending in the circumferential direction of the tire and by lateral grooves extending in the width direction of the tire. Open sipes and closed sipes are alternately arranged, and the depth of the open sipes is less than the depth of the closed sipes.

19 Claims, 3 Drawing Sheets

(56) References Cited

U.S. PATENT DOCUMENTS

| | | | |
|---|---|---|---|
| 5,733,393 A * | 3/1998 | Hubbell et al. | 152/209.5 |
| 5,885,384 A | 3/1999 | Himuro | |
| 6,427,737 B1 | 8/2002 | Katayama | |
| 6,554,034 B1 | 4/2003 | Minami | |
| 6,571,844 B1 | 6/2003 | Ochi et al. | |
| 7,032,635 B2 | 4/2006 | Hashimoto et al. | |
| 7,416,004 B2 | 8/2008 | Koya | |
| 2002/0005238 A1 | 1/2002 | Boiocchi et al. | |
| 2002/0144762 A1 | 10/2002 | Peda et al. | |
| 2003/0094226 A1* | 5/2003 | Colombo et al. | 152/209.18 |
| 2004/0238092 A1 | 12/2004 | Colombo et al. | |
| 2004/0256041 A1 | 12/2004 | Ratliff, Jr. | |
| 2006/0032566 A1 | 2/2006 | Koya | |
| 2006/0086445 A1 | 4/2006 | Koshida | |
| 2009/0078351 A1 | 3/2009 | Ebiko | |
| 2010/0116392 A1 | 5/2010 | Yamakawa | |
| 2011/0162770 A1 | 7/2011 | Yamakawa | |

FOREIGN PATENT DOCUMENTS

| | | |
|---|---|---|
| GB | 2017597 A | 10/1979 |
| GB | 2093777 A | 9/1982 |
| GB | 2 376 217 A | 12/2002 |
| JP | 62-251206 A | 11/1987 |
| JP | 05-229311 A | 9/1993 |
| JP | H06-219108 A | 8/1994 |
| JP | 08-216623 A | 8/1996 |
| JP | 09-020108 A | 1/1997 |
| JP | 09-328003 A | 12/1997 |
| JP | 10-016514 A | 1/1998 |
| JP | 11-115418 A | 4/1999 |
| JP | 11-310013 A | 11/1999 |
| JP | 2001-039126 A | 2/2001 |
| JP | 2001-213121 A | 8/2001 |
| JP | 2001-213122 A | 8/2001 |
| JP | 2002-192917 A | 7/2002 |
| JP | 2002-240513 A | 8/2002 |
| JP | 2003-211921 A | 7/2003 |
| JP | 2003-237320 A | 8/2003 |
| JP | 2005-349970 A | 12/2005 |
| JP | 2006-051891 A | 2/2006 |
| JP | 2006-103464 A | 4/2006 |
| JP | 2006-298055 A | 11/2006 |
| JP | 2007-062690 A | 3/2007 |
| JP | 2008-007047 A | 1/2008 |

OTHER PUBLICATIONS

Information Disclosure Statement submitted in U.S. Appl. No. 13/000,744, filed Dec. 22, 2010.

* cited by examiner

PNEUMATIC TIRE

CROSS-REFERENCE TO RELATED APPLICATIONS

This U.S. National stage application claims priority under 35 U.S.C. §119(a) to Japanese Patent Application No. 2008-235017, filed in Japan on Sept. 12, 2008, the entire contents of which are hereby incorporated herein by reference.

TECHNICAL FIELD

The present invention relates to a pneumatic tire, and more specifically to a pneumatic tire having a block row at least in a shoulder portion and multiple sipes which are provided in blocks of the block row and which extend in the width direction of the tire, the pneumatic tire having enhanced durability without impairing on-ice performance.

BACKGROUND ART

Generally, a block pattern is employed as the tread pattern of a winter tire (a studless tire). The block pattern enhances on-snow performance by facilitating biting of blocks into snow which is to be fitted into a space between blocks adjacent to each other in the circumferential direction of the tire. In addition, braking and driving performance on an icy road surface (on-ice performance) is enhanced by a water-film removing effect and an edge effect which are achieved by providing to the blocks sipes extending in the width direction of the tire.

Of these, the on-ice performance can be further enhanced simply by increasing the number of sipes in the circumferential direction. However, the increase in the number of the sipes results in short intervals of sipes, so that the block rigidity is lowered, and the amount of deformation of the blocks is increased. For this reason, stress is excessively concentrated on the bottom portions of the sipes, so that cracks are more likely to be formed in the bottom portions of the sipes. In other words, when the number of sipes is simply increased to raise the on-ice performance, and thus the intervals of the sipes are shortened, the durability of the tire is degraded. In this respect, for a method for raising the on-ice performance of a tire without impairing the durability thereof, it is preferable not to shorten the intervals of the sipes.

For example, Japanese patent application Kokai publication No. 2001-39126 describes that, in addition to sipes extending in the width direction of a tire, other sipes having a shallower depth are provided in such a manner as to cross the sipes extending in the width direction of the tire. Also Japanese patent application Kokai publication No. 2003-237320describes that deformation of small blocks defined by open sipes provided to open into main grooves is suppressed by causing the heights of the small blocks to be different between adjacent small blocks, so that the sipe depths can be offset alternately.

However, in the former case, since the blocks become smaller by the provision of the crossing sipes, the effect of enhancing the durability can not necessarily be said to be large. Meanwhile, in the latter case, although some measures are taken for the durability, blocks having different heights are formed. Hence, there is a problem that blocks having a larger height have a higher contact pressure, and thus are more worn. This also can not necessarily be said to achieve sufficient durability.

SUMMARY

An object of the present invention is to solve the above-described problems and to provide a pneumatic tire achieving an enhanced durability, while high on-ice performance is being maintained.

A pneumatic tire of the present invention for achieving the above object is a pneumatic tire wherein multiple longitudinal grooves extending in a circumferential direction of the tire and multiple lateral grooves extending in a width direction of the tire form multiple land portions on a tread surface, at least multiple land portions formed in a shoulder portion are arranged into a block row having multiple blocks arranged therein, and multiple sipes extending in the width direction of the tire are provided in the blocks at intervals in the circumferential direction of the tire, the pneumatic tire characterized in that the multiple sipes provided to the blocks are formed in such a manner that open sipes and closed sipes are alternately arranged in the circumferential direction of the tire, and the depth of the open sipes is offset to be shallower than the depth of the closed sipes.

Moreover, the above-described configuration is preferably configured as described in the following (1) to (3):

(1) the depths of the sipes are set to 50% to 90% of the depth of the longitudinal grooves, and the offset amount in depth between the open sipes and the closed sipes are set to 0.5 mm or more and 2.0 mm or less;

(2) each of the sipes is divided into two in the width direction of the tire, and among these sipes, the depths of sipes adjacent to each other in the circumferential direction of the tire are offset from each other, and the depths of sipes adjacent to each other in the width direction of the tire are offset from each other; and (3) a lower layer portion and an upper layer portion of each of the blocks are formed of rubber compositions different from each other, respectively, the lower layer portion is formed of a rubber composition harder than that of the upper layer portion, and all bottom portions of the sipes extend into the lower layer portion.

The tire having the above-described configuration is suitable particularly as a studless tire.

According to the present invention, in the pneumatic tire wherein the multiple sipes extending in the width direction of the tire are provided at intervals in the circumferential direction of the tire at least in the blocks in the block row formed in the shoulder portion, the multiple sipes provided to the blocks are formed in such a manner that open sipes and closed sipes are alternately arranged in the circumferential direction of the tire and the depth of the open sipes is offset to be shallower than the depth of the closed sipes. Hence, the stress concentrating on the bottom portions of sipes adjacent to each other is dispersed so as not to be concentrated on a line of the same depth. In addition, the depth of the open sipes which have a higher edge effect in the circumferential direction of the tire is made shallower than the closed sipes having a lower edge effect than the open sipes. As a result, a state where the bending rigidity of the blocks as a whole is high is achieved. Thus, while a high on-ice performance is being maintained, the durability can be enhanced.

BRIEF DESCRIPTION OF THE DRAWINGS

FIG. 1 shows a tread surface of a pneumatic tire according to an embodiment of the present invention. In FIG. 1, multiple longitudinal grooves 2 extending in the circumferential direction of the tire and multiple lateral grooves 3 extending in the width direction of the tire are provided on a tread surface 1. Multiple land portions defined by these longitudinal grooves 2 and lateral grooves 3 are formed. In these land portions, a rib row of a rib 4 extending in the circumferential direction is formed in a tire center portion, in the embodiment shown in FIG. 1. Multiple block rows in which many blocks 5 are arranged are formed on both right and left sides of the rib row. Many zigzag sipes 6 each extending in the width direction of the tire are provided to the rib 4 and the blocks 5. These sipes 6 exhibit a water-film removing effect and an edge effect on an icy road surface, and hence contribute to the enhancement of the on-ice performance.

Of these land portions provided with the sipes, blocks in the outermost block rows in shoulder portions contribute most to the on-ice performance. These blocks each have, as the sipes 6, open sipes 6a and closed sipes 6b arranged alternately with each other. Here, an open sipe refers to a sipe having at least one end portion opening to one of the longitudinal grooves 2. A closed sipe refers to a sipe having both end portions not opening to the longitudinal grooves 2.

Figure 1:
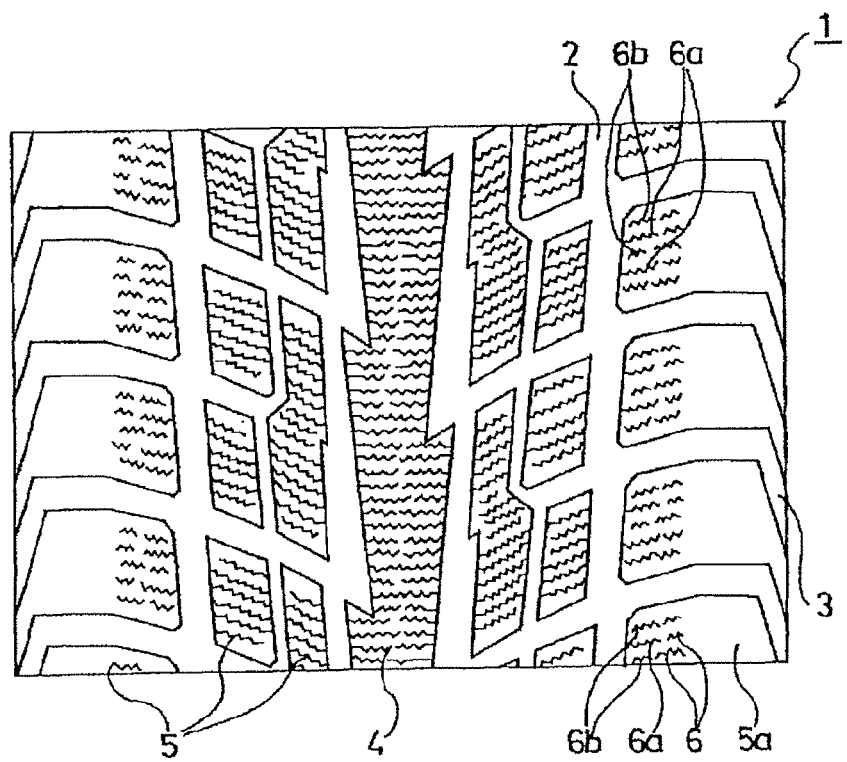
FIG. 1 is a partial developed plan view showing an example of a tread surface of a pneumatic tire according to an embodiment of the present invention.
Figure 2:
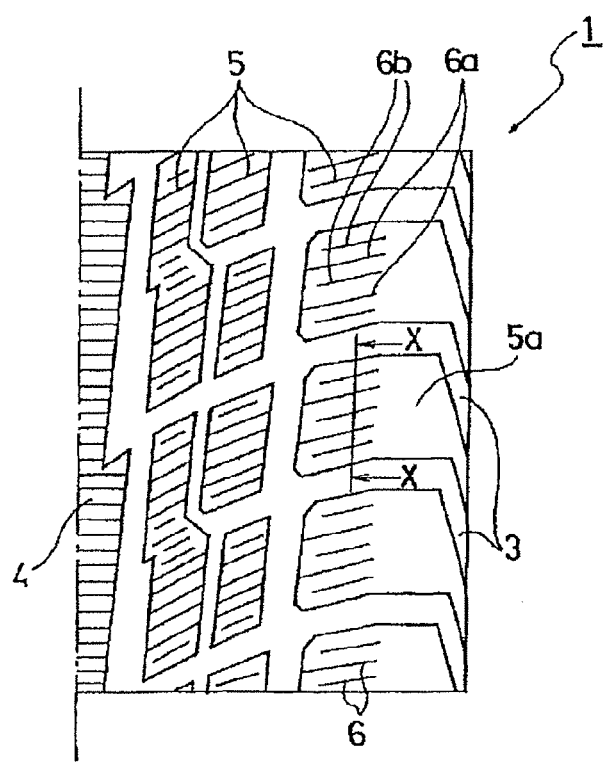
FIG. 2 is a partial developed plan view showing a tread surface of a pneumatic tire according to another embodiment of the present invention.

The shape of each sipe 6 in the plan view is not necessarily zigzag as in the case of the embodiment of FIG. 1, but may be linear as in the case of the embodiment of FIG. 2. Meanwhile, the shape of each sipe 6 in the depth direction may have a structure linearly extending in the depth direction, may be zigzag in the circumferential direction of the tire, or may have a three-dimensional structure in which the sipe 6 winds in a zigzag manner in the width direction of the tire, in addition to the zigzag in the circumferential direction of the tire.

Figure 3:
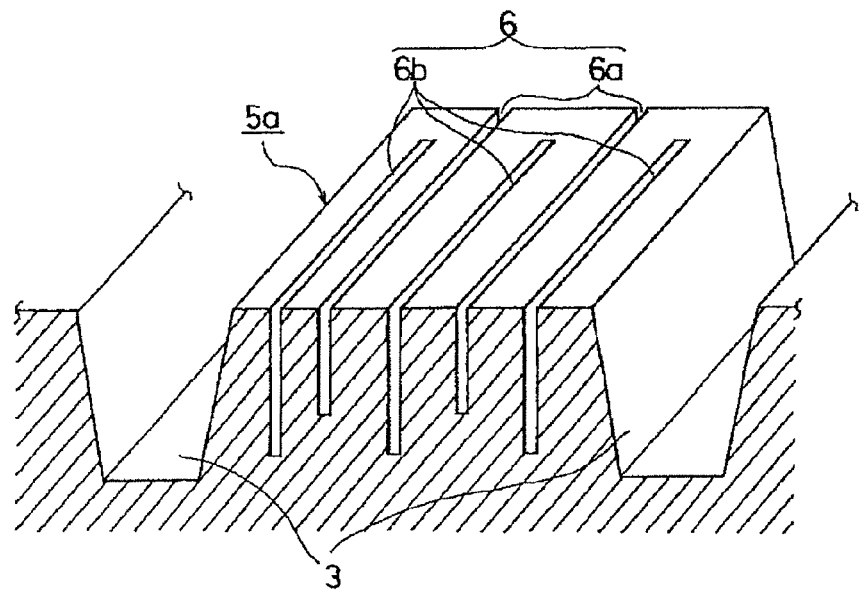
FIG. 3 is an X-X arrow view of the pneumatic tire according to the embodiment of FIG. 2.

FIG. 3 is a perspective view of a shoulder block 5a, the perspective view showing the X-X cross-section of FIG. 2 viewed in the width direction of the tire. Not only in the case of FIG. 2, but also in the case of FIG. 1, the open sipes 6a and the closed sipes 6b alternately arranged in the circumferential direction of the tire as described above are formed so that the depth of the open sipes 6a can be shallower than the depth of the closed sipes 6b.

The open sipes 6a have such a long sipe length that the edge amount can be increased, and the on-ice performance can be enhanced. On the other hand, the open sipes 6a are prone to deform because of the large edge effect, so that the block rigidity is lowered. In contrast, the closed sipes 6b cause a high block rigidity because the closed sipes 6b have a lower edge effect than the open sipes 6a and hence are less prone to deform than the open sipes 6a. However, the enhancement in on-ice performance as in the case of the open sipes cannot be expected with the closed sipes 6b. Nevertheless, when the depth of the open sipes 6a is offset so as to be shallower than that of the closed sipes 6b as shown in FIG. 3, the deformation of the open sipes 6a can be suppressed, so that the stress concentrating on the bottom portion of the sipes can be reduced. In addition, since both end portions of each sipe is closed, a high rigidity can be maintained. Since the closed sipes 6b are deeper than the open sipes 6a, bottom portions of adjacent sipes are not on a single straight line. Thus, the stress is dispersed, and formation of cracks can be prevented.

The sipe depth of each open sipe 6a and the sipe depth of each sipe 6b are both preferably 50% to 90% of the depth of the longitudinal grooves 2. If each sipe depth is less than 50%, the sipe depth is too shallow. As a result, the on-ice performance is lost before the last stage of wearing, and the on-ice performance cannot be maintained for a long period of time. If each sipe depth exceeds 90%, the depth of the longitudinal grooves 2 and the sipe depth are substantially the same, so that the stress is concentrated on the sipe bottom portion, and formation of cracks is induced.

The amount of the offset in the depth direction between the open sipes 6a and the closed sipes 6b is preferably 0.5 mm or more and 2.0 mm or less, in order to avoid the concentration of the stress on the sipe bottom portions. If the amount is less than 0.5 mm, the effect of preventing the concentration of the stress cannot be obtained. If the amount exceeds 2.0 mm, the block rigidity between the sipes is increased, so that heel and toe wear occurs.

In addition, sipes provided on the outermost sides (the lateral groove sides) in the circumferential direction in each block are preferably closed sipes. Since the strain is larger in the outermost side in the circumferential direction of each block than in a central portion thereof, the heel and toe wear can be more suppressed, and the durability can be more enhanced in the case where closed sipes having high rigidity are disposed than in the case where open sipes are disposed.

Figure 4:
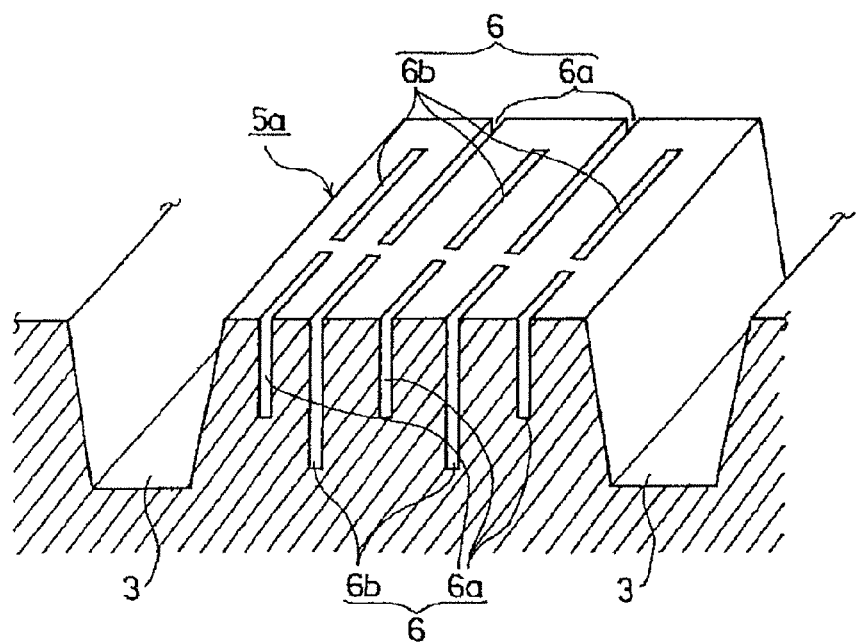
FIG. 4 is a view of a portion of still another embodiment of the present invention, the portion corresponding to that of FIG. 3.

FIG. 4 shows still another embodiment of the present invention in a view corresponding to FIG. 3.

In the embodiment of FIG. 4, the structure is such that each sipe 6 is divided into two in the width direction of the tire, and the depths of adjacent sipes are alternately offset. With this structure, the concentration of the stress can be further dispersed, so that the durability can be enhanced.

When each sipe 6 is divided as described above, it is preferable that the distance between edges of the divided sipes be 5% to 20% of the length of the original sipe. If the distance is less than 5%, the interval between sipe edges is so short that the formation of cracks is induced. If the distance exceeds 20%, the sipe length is so small that the edge amount decreases, and the on-ice performance is impaired.

In addition, it is preferable for the tread to have a double-layer structure including a lower layer having a large rubber hardness and an upper layer having a small rubber hardness. This structure allows each shoulder block 5a to be formed of two layered rubber compositions different from each other. Here, the rubber composition of the lower layer portion 7 is made harder than the rubber composition of the upper layer portion 8, and bottom portions of all the sipes 6 provided in the shoulder block 5a extend into the lower layer portion 7. By arranging the sipe bottom portion in the lower layer portion 7 having large rubber hardness, the amount of the deformation of the bottom portion can be suppressed, and hence the formation of cracks can be prevented. At this time, it is preferable that the JIS-A-type hardness of the rubber composition of the upper layer portion 8 be set in a range from 40 to 65, and that the JIS-A-type hardness of the rubber composition of the lower layer portion 7 be set in the range from 55 to 75. If the hardness of the upper layer portion 8 is less than 40, the upper layer portion 8 is so soft that the maneuverability is impaired, or wearing proceeds rapidly. If the hardness exceeds 65, the upper layer portion 8 becomes hard to deform, so that the griping is deteriorated. Meanwhile, if the hardness of the lower layer portion 7 is less than 55, the amount of the deformation cannot be suppressed, so that formation of cracks cannot be prevented. Meanwhile, if the hardness exceeds 75, the deformation is suppressed so excessively that the driving performance becomes poor.

Conventional Examples 1 and 2 and Examples 1 to 3 were manufactured with the same tire size of 225/65R17 101Q and with the same tread pattern described in FIG. 1, while differing from one another in specifications as shown in Table 1.

Figure 5:
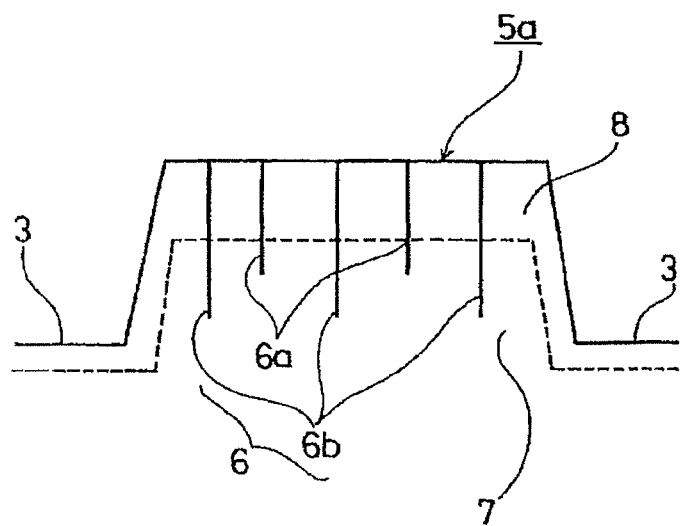
FIG. 5 is a cross-sectional view of a portion of yet another embodiment of the present invention, the portion corresponding to that of FIG. 3.

In Conventional Example 1, sipe depths were uniform, all sipes were open sipes, the sipes were not divided, and each block was made of a single layer rubber composition alone. In Conventional Example 2, sipes were open sipes whose sipe depths were offset, but which were not divided, and each block was made of a single layer rubber composition alone. Example 1 is an example in which open sipes and closed sipes were alternately arranged, and the open sipes were offset so as to be shallower than the closed sipes, and corresponds to FIG. 3. Example 2 is a modified example of Example 1 where the sipes were divided, and corresponds to FIG. 4. Example 3 is a modified example of Example 2 where each block had a double layer structure, and a rubber composition having a higher rubber hardness was disposed in the lower layer side, and corresponds to FIG. 5.

These five kinds of tires were measured for on-ice braking, crack formation resistance, crack growth resistance by the following measurement methods, and were compared with each other.

[Measurement Methods]

(1) For on-ice braking, the braking distance on a test course at an initial speed of 40 km/h was measured, and the on-ice braking was evaluated by using index values with the value of Conventional Example 1 taken as 100. A larger index value means better on-ice braking.

(2) For crack formation resistance, the number of cracks formed from bottom portions of the sipes was examined after a 50000-km drive, and the crack formation resistance was evaluated by using index values of the reciprocal of the number of cracks with the value of Conventional Example 1 taken as 100. A larger index value means better crack formation resistance.

(3) For crack growth resistance, the number of portions where three or more cracks are connected was examined after a 50000-km drive, and the crack growth resistance was evaluated by using index values of the reciprocal of the number of portions with the value of Conventional Example 1 taken as 100. A larger index value means better crack growth resistance.

TABLE 1

| | | Conventional Example 1 | Conventional Example 2 | Example 1 | Example 2 | Example 3 |
|---|---|---|---|---|---|---|
| Specifications | Offset of sipe depths | x | ○ | ○ | ○ | ○ |
| | Alternate arrangement of open sipes and close sipes | x | x | ○ | ○ | ○ |
| | Divided sipes | x | x | x | ○ | ○ |
| | Double layer structure of blocks | x | x | x | x | ○ |
| Evaluations | On-ice braking | 100 | 100 | 103 | 103 | 105 |
| | Crack formation resistance | 100 | 103 | 105 | 107 | 109 |
| | Crack growth resistance | 100 | 100 | 103 | 105 | 107 |

According to Table 1, Example 3 was the best.

What is claimed is:

1. A pneumatic tire comprising:
   a tire center portion of a tread surface of the tire;
   a first shoulder portion of the tread surface of the tire disposed on a first side of the tire center portion with respect to a width direction of the tire; and
   a second shoulder portion of the tread surface of the tire disposed on a second side of the tire center portion with respect to the width direction of the tire,
   the tire center portion being separated from the first and second shoulder portions by first and second longitudinal grooves formed in the tread surface of the tire, respectively, and extending in a circumferential direction of the tire,
   the first shoulder portion including a plurality of lateral grooves formed in the tread surface and extending in the width direction of the tire, the lateral grooves being arranged to form a first block row having a plurality of first blocks,
   each of the first blocks including a plurality of first sipes extending in the width direction of the tire, the first sipes being spaced apart at intervals in the circumferential direction of the tire, the first sipes including a plurality of first open sipes and a plurality of first closed sipes, the first open sipes being alternately arranged with the first closed sipes in the circumferential direction of the tire,
   the first open and closed sipes having depths with respect to the tread surface, with the depths of the first open sipes in the tread surface being shallower than the depths of the first closed sipes in the tread surface,
   the depths of the first sipes being in a range from 50% to 90% inclusively of a depth of the first longitudinal groove in the tread surface, and
   a difference between the depths of the first open sipes and the depths the first closed sipes being within a range from 0.5 mm to 2.0 mm inclusively.

2. The pneumatic tire according to claim 1, wherein the pneumatic tire is a studless tire configured such that the tread surface is studless.

3. The pneumatic tire according to claim 1, wherein
   each of the open and closed sipes is divided into two sipe sections that are separated in the width direction of the tire by adjacent closed ends, respectively, and
   the depths of the sipe sections adjacent to each other in the circumferential direction of the tire are different from each other, and the depths of the sipe sections adjacent to each other in the width direction of the tire are different from each other.

4. The pneumatic tire according to claim 1, wherein
   each of the first blocks includes a lower layer portion and an upper layer portion, the lower layer portion being formed of a rubber composition harder than that of the upper layer portion, and
   all bottom portions of the first sipes extend into the lower layer portion.

5. The pneumatic tire according to claim 3, wherein
each of the first blocks includes a lower layer portion and an upper layer portion, the lower layer portion being formed of a rubber composition harder than that of the upper layer portion, and
all bottom portions of the first sipes extend into the lower layer portion.

6. The pneumatic tire according to claim 1, wherein
the first open sipes are open in a direction toward the tire center portion of the tread surface.

7. The pneumatic tire according to claim 1, wherein
the first closed sipes are disposed at an outermost side of each of the first blocks in the circumferential direction.

8. The pneumatic tire according to claim 1, wherein
the tire center portion of the tread surface includes a rib row extending in the circumferential direction of the tire.

9. The pneumatic tire according to claim 8, wherein
the first open sipes are open in a direction toward the rib row.

10. The pneumatic tire according to claim 1, wherein
the second shoulder portion includes a plurality of lateral grooves forming a second block row having at least a plurality of second blocks, each of the second blocks including a plurality of second sipes extending in the width direction of the tire, the second sipes being spaced apart at intervals in the circumferential direction of the tire, the second sipes including a plurality of second open sipes and a plurality of second closed sipes.

11. The pneumatic tire according to claim 10, wherein
the second open and closed sipes have depths with respect to the tread surface, with the depths of the second open sipes in the tread surface being shallower than the depths of the second closed sipes in the tread surface.

12. The pneumatic tire according to claim 10, wherein
the first and second open sipes in the first and second blocks are open in a direction toward the tire center portion of the tread surface.

13. The pneumatic tire according to claim 10, wherein
the first and second closed sipes are disposed at an outermost side of each of the first and second blocks in the circumferential direction.

14. The pneumatic tire according to claim 10, wherein
the tire center portion of the tread surface includes a rib row extending in the circumferential direction of the tire and disposed between the first block row and the second block row.

15. The pneumatic tire according to claim 14, wherein
the first and second open sipes in the first and second blocks are open in a direction toward the rib row.

16. A pneumatic tire comprising:
a tire center portion of a tread surface of the tire;
a first shoulder portion of the tread surface of the tire disposed on a first side of the tire center portion with respect to a width direction of the tire; and
a second shoulder portion of the tread surface of the tire disposed on a second side of the tire center portion with respect to the width direction of the tire,
the tire center portion being separated from the first and second shoulder portions by first and second longitudinal grooves formed in the tread surface of the tire, respectively, and extending in a circumferential direction of the tire,
the first shoulder portion including a plurality of lateral grooves formed in the tread surface and extending in the width direction of the tire, the lateral grooves being arranged to form a first block row having a plurality of first blocks,
each of the first blocks including a plurality of first sipes extending in the width direction of the tire, the first sipes being spaced apart at intervals in the circumferential direction of the tire, the first sipes including a plurality of first open sipes and a plurality of first closed sipes, the first open sipes being alternately arranged with the first closed sipes in the circumferential direction of the tire,
the first open and closed sipes having depths with respect to the tread surface, with the depths of the first open sipes in the tread surface being shallower than the depths of the first closed sipes in the tread surface,
each of the first open and closed sipes being divided into two sipe sections that are separated in the width direction of the tire by adjacent closed ends, respectively, and
the depths of the sipe sections adjacent to each other in the circumferential direction of the tire being different from each other, and the depths of the sipe sections adjacent to each other in the width direction of the tire being different from each other.

17. The pneumatic tire according to claim 16, wherein
each of the first blocks includes a lower layer portion and an upper layer portion, the lower layer portion being formed of a rubber composition harder than that of the upper layer portion, and
all bottom portions of the first sipes extend into the lower layer portion.

18. The pneumatic tire according to claim 16, wherein
a distance between the adjacent closed ends of the two sipe sections is within a range from 5% to 20% inclusively of a length of the first sipe that has been divided into the two sipe sections.

19. A pneumatic tire comprising:
a tire center portion of a tread surface of the tire;
a first shoulder portion of the tread surface of the tire disposed on a first side of the tire center portion with respect to a width direction of the tire; and
a second shoulder portion of the tread surface of the tire disposed on a second side of the tire center portion with respect to the width direction of the tire,
the tire center portion being separated from the first and second shoulder portions by first and second longitudinal grooves formed in the tread surface of the tire, respectively, and extending in a circumferential direction of the tire,
the first shoulder portion including a plurality of lateral grooves formed in the tread surface and extending in the width direction of the tire, the lateral grooves being arranged to form a first block row having a plurality of first blocks,
each of the first blocks including a plurality of first sipes extending in the width direction of the tire, the first sipes being spaced apart at intervals in the circumferential direction of the tire, the first sipes including a plurality of first open sipes and a plurality of first closed sipes, the first open sipes being alternately arranged with the first closed sipes in the circumferential direction of the tire,
the first open and closed sipes having deaths with respect to the tread surface, with the depths of the first open sipes in the tread surface being shallower than the depths of the first closed sipes in the tread surface,
each of the first blocks including a lower layer portion and an upper layer portion, the lower layer portion being formed of a rubber composition harder than that of the upper layer portion, and
all bottom portions of the first sipes extending into the lower layer portion.

* * * * *